United States Patent
Svensson

(10) Patent No.: US 11,632,943 B2
(45) Date of Patent: Apr. 25, 2023

(54) SPLITTING LINE GUIDE

(71) Applicant: Pure Fishing, Inc., Spirit Lake, IA (US)

(72) Inventor: Patrik Svensson, Asarum (SE)

(73) Assignee: Pure Fishing, Inc., Spirit Lake, IA (US)

( * ) Notice: Subject to any disclaimer, the term of this patent is extended or adjusted under 35 U.S.C. 154(b) by 16 days.

(21) Appl. No.: 17/335,236

(22) Filed: Jun. 1, 2021

(65) Prior Publication Data

US 2021/0368758 A1  Dec. 2, 2021

Related U.S. Application Data

(60) Provisional application No. 63/033,587, filed on Jun. 2, 2020.

(51) Int. Cl.
*A01K 89/01* (2006.01)
*A01K 89/015* (2006.01)

(52) U.S. Cl.
CPC .............................. *A01K 89/01917* (2015.05)

(58) Field of Classification Search
CPC ...... A01K 89/01917; A01K 89/019125; A01K 89/01913; A01K 89/01915
See application file for complete search history.

(56) References Cited

U.S. PATENT DOCUMENTS

| | | | | |
|---|---|---|---|---|
| 1,468,128 A | * | 9/1923 | Adams | A01K 89/015 242/280 |
| 2,641,417 A | * | 6/1953 | Kinsey | A01K 89/01916 242/280 |
| 4,583,699 A | | 4/1986 | Karlsson | |
| 4,799,628 A | * | 1/1989 | Watanabe | A01K 89/01916 242/280 |
| 5,127,600 A | * | 7/1992 | Ikuta | A01K 89/01918 242/280 |
| 7,568,650 B2 | * | 8/2009 | Barker | B66D 1/38 242/397.2 |

\* cited by examiner

*Primary Examiner* — Emmanuel M Marcelo
(74) *Attorney, Agent, or Firm* — Husch Blackwell LLP

(57) ABSTRACT

The present invention is a splitting line guide that includes two guide mechanisms that are connected to one another via a driver unit that is connected to a worm shaft. In a first casting position, when a free spool clutch is depressed, the driver unit rotates forwardly. The two guide mechanisms are in turn disconnected from the driver unit. This decreases resistance on the line during casting to increase casting distance and reduce the risk of backlash during casting. When a user is ready to return the line guide to its position where the line guide mechanisms are near each other to help with spooling line, he or she may simply begin cranking a reel. This causes the driver unit to rotate rearwardly. The driver unit may then re-engage the guide mechanisms such that they are arranged closely to one another so that line can evenly be distributed on the spool without any large build up of line in any one spot on the spool.

10 Claims, 4 Drawing Sheets

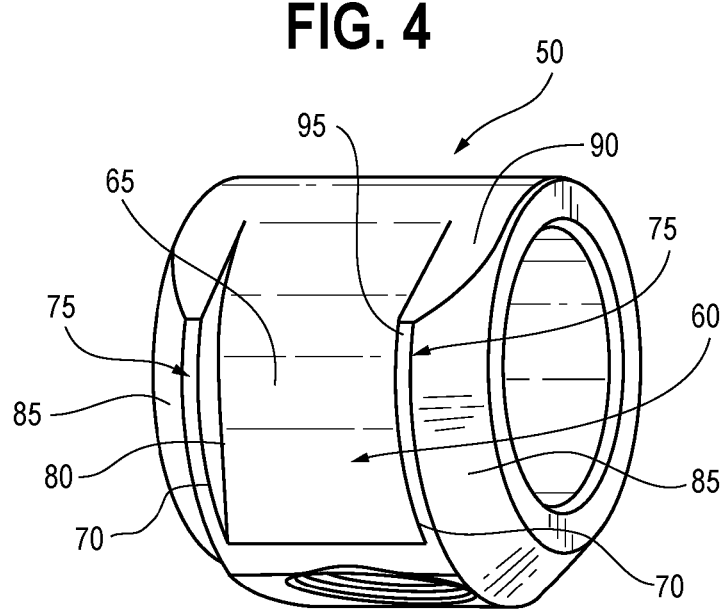
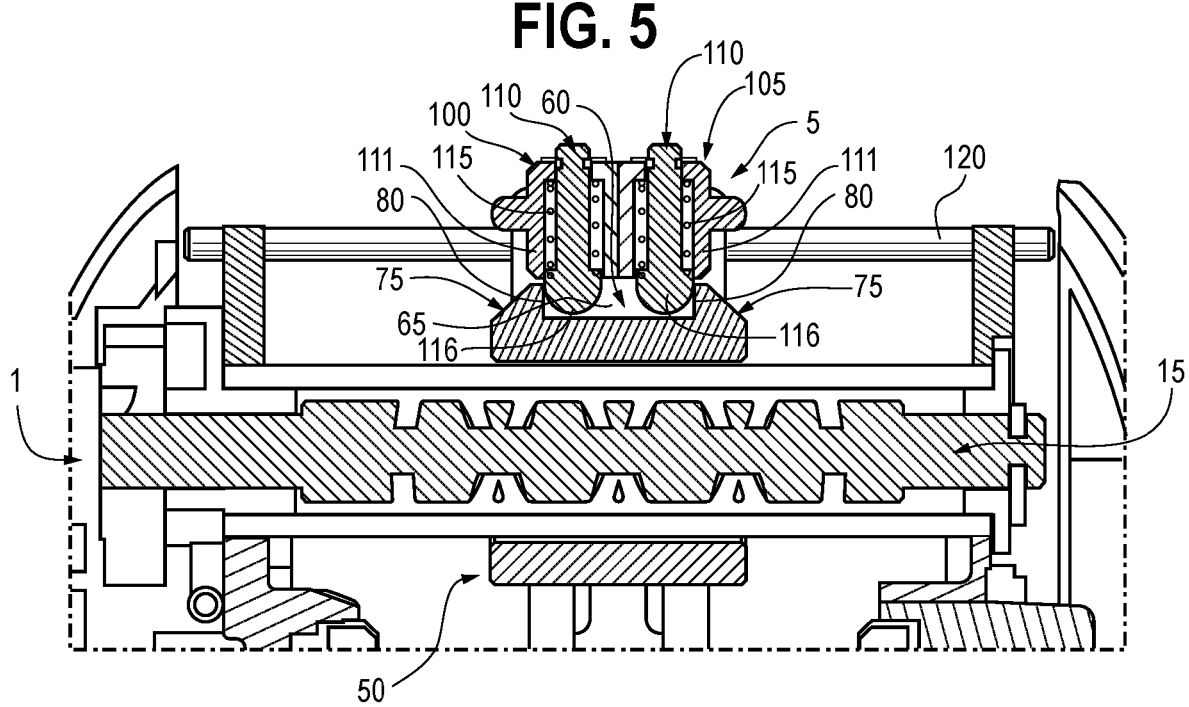

SPLITTING LINE GUIDE

CROSS-REFERENCE TO RELATED APPLICATIONS

This application claims priority to U.S. Provisional Patent Application Ser. No. 63/033,587, filed on Jun. 2, 2020, entitled "Splitting Line Guide,", the entire disclosure of which is incorporated herein by reference.

BACKGROUND OF THE INVENTION

When fishing, during casting, anglers prefer that the line runs off the spool as easily and with as little friction as possible. However, when reeling in, anglers prefer that line be evenly distributed onto the spool, from side to side, without any large build ups of line in any one spot on the spool.

Open style conventional reels have no line guide and the distribution of the line back onto the spool is the responsibility of the angler. Other reels, known in the art as level wind reels, feature a moving line guide. The moving line guide includes a pawl which runs back and forth across the front of the reel upon a worm shaft. As line is retrieved back onto the reel, the moving line guide ensures that the line is evenly distributed onto the spool. Although helpful, such moving line guides are not without criticism and complaint. One substantial complaint is that some anglers believe that the line guide will affect their casting ability. More particularly, the line guide may present an extra contact surface to the line that open faced reels don't have, leading to additional friction.

An example device that includes a line guide is provided in U.S. Pat. No. 4,583,699 titled "Level Winding Fishing Reel." The reel provided in that patent includes a hand crank, a transmission driven by the crank, a line spool driven by the crank through the transmission, and a level-wind mechanism. The level-wind mechanism includes a first guide mechanism and a second guide mechanism parallel to the first guide mechanism. The guide mechanisms are movable towards one another (for example, by a user's fingers) into a first position in which the guide mechanisms together define a relatively narrow, elongate slot for guiding the fishing line during retrieval thereof on the line spool. The guide mechanisms are also movable away from one another into a second position in which the guide mechanisms are moved apart and in which the fishing line is substantially free from the guide mechanisms, for use (for example) during casting.

However, in the invention described in U.S. Pat. No. 4,583,699 and other prior art line guides, the guide mechanisms are movable away from one another by force. Insufficient force provided by the line during casting may not be big enough to overcome the friction between the line guide and its associated shaft. As such, the line guide mechanisms may not be sufficiently separated to provide adequate casting ability.

SUMMARY OF THE INVENTION

It is the object of this invention to eliminate these shortcomings by providing a device by which the two line guide mechanisms are safely and simply disengaged, and unintentional reengagement is prevented. More particularly, the present invention includes two guide mechanisms that are connected to one another via a driver unit that is connected to a worm shaft. When a free spool clutch is depressed, the driver units rotate forwardly. The two guide mechanisms are in turn disconnected from the driver unit. In one embodiment, a spring may be provided such that the two guide mechanisms, when disconnected from the driver unit, stay separated from each other such that line may freely flow from the spool. In alternative embodiments, two magnets with the same polarization may be mounted on the guide mechanisms to keep them separated from one another. This preferably substantially decreases resistance on the line during casting which in turn increases casting distance and reduces the risk of backlash during casting.

When a user is ready to return the line guide to its position where the line guide mechanisms are near each other to help with spooling line, he or she may simply begin cranking the reel so that the driver unit rotates rearwardly. The driver unit may then re-engage the guide mechanisms such that they are arranged closely to one another. When they are close to one another, the line guide may carry out its intended function of keeping line evenly distributed on the spool without any large build ups of line in any one spot on the spool.

BRIEF DESCRIPTION OF THE DRAWINGS

For a better understanding of the present invention, reference may be made to the following accompanying drawings.

FIG. 4 is a perspective view of a driver unit of the driver assembly of FIG. 1;

FIG. 5 is a cross-section view of the driver assembly and the splitting line guide assembly when the splitting line guide assembly is in a closed position;

DETAILED DESCRIPTION OF THE INVENTION

Figure 1:
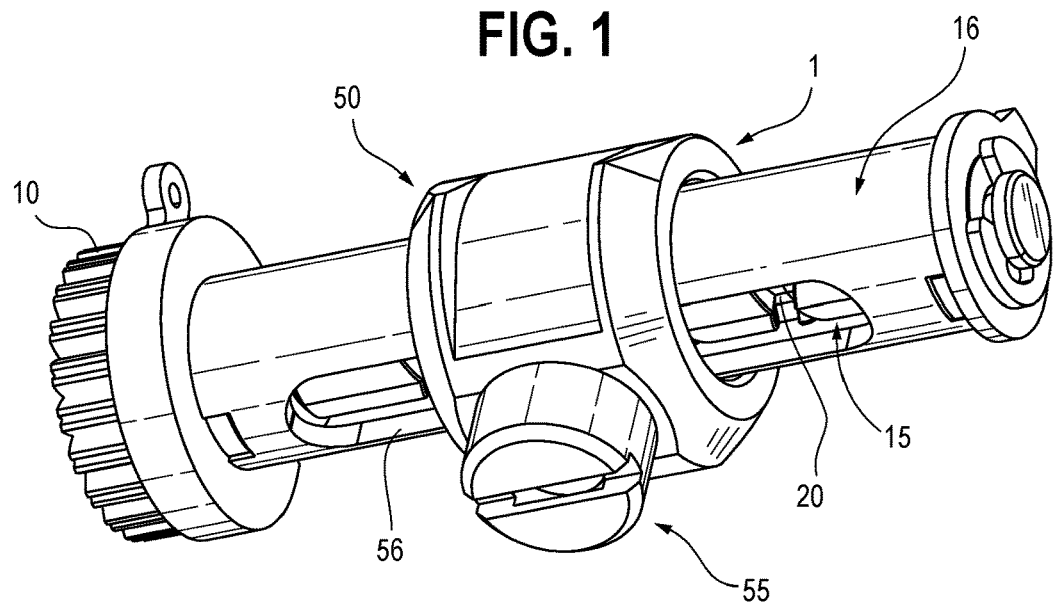
FIG. 1 is a perspective view of a driver assembly used to control a splitting line guide assembly that is constructed according to the teachings hereof.

Turning first to FIG. 1, a driver assembly 1 is illustrated that may be used to operate a splitting line guide assembly 5 (illustrated in operation with the driver assembly 1 in FIGS. 5-9). Like known driver assemblies used in baitcaster reels, the driver assembly 1 includes a gear member 10 that may be driven by a gear connected to the main gear (not illustrated). The main gear is preferably in communication with a crank shaft that is further in communication with the baitcaster reel's handle. As such, when an angler rotates the reel's handle, the gear member 10 may be rotated via the crank shaft, and/or main gear.

The gear member 10 is preferably fixed (permanently or semi-permanently) to a worm shaft 15. The worm shaft 15 may be retained within a cylindrical body 16 of the driver assembly 1, and includes a slot member 20. Unlike prior art driver assemblies, the driver assembly 1 further includes a driver unit 50 in which a pilot guide 25 is retained. The pilot guide 25 includes a nut 55 to keep the pilot guide 25 in place, and the pilot guide 25 may travel along the slot member 20 of the worm shaft 15. The driver unit 50 is thereby connected to the worm shaft 15 via the pilot guide 25 that is seated within the driver unit 50. The pilot guide 25 may engage with the worm shaft 15 through an aperture 56 that extends through the body 16 of the driver assembly 1.

Figure 2:
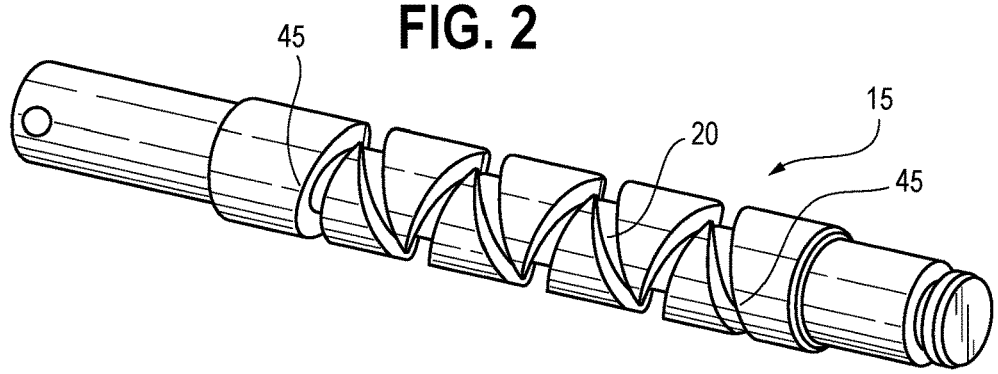
FIG. 2 is a perspective view of a worm shaft of the driver assembly of FIG. 1.

The worm shaft 15 is better illustrated in FIG. 2, and as is better visible in FIG. 2, the slot member 20 the worm shaft 15 may extend along a substantial portion of the length of the worm shaft 15. The slot member 20 is generally formed as a helix-shaped groove in which the pilot guide 25 may travel.

Figure 3:
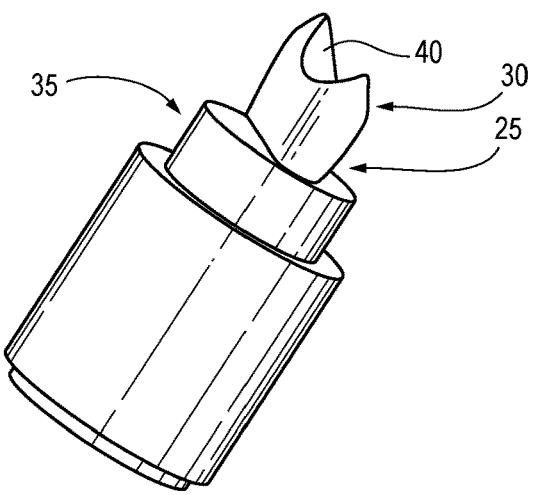
FIG. 3 is a perspective view of a pilot guide of the driver assembly of FIG. 1.

As shown in FIG. 3, the pilot guide 25 preferably includes an extension member 30 that projects upwardly from an upper portion 35 of the pilot guide 25. The extension member 30 includes a throated portion 40 that is received by the slot member 20 when the pilot guide 25 and the worm shaft 15 are engaged with one another. As known and understood in the art, as the gear member 10 rotates (for example, by rotating the handle of the reel), the worm shaft 15 similarly rotates. This causes the pilot guide 25, and more particularly its throated portion 40, to move side-to-side within the slot member 20. When the throated portion 40 reaches either end portion 45 of the slot member 20, the pilot guide 25 may change direction such that it travels toward the other end portion 45. This mechanism for spooling line while an angler is turning the reel's handle associated with the crank shaft is well known and understood in the art.

As shown in FIG. 4, unlike other driver units, a front face 60 of the driver unit 50 includes a substantially flat slotted portion 65 that is defined on outside edges 70 by a wall member 75. Nearer the slotted portion 65, an interior portion 80 of the wall member 75 is at a substantially 90° angle relative to the slotted portion 65, though angles less than 90° are also foreseeable. At an exterior portion 85 of the wall member 75, the wall member 75 is preferably tapered such that it is wider at a proximal portion 90 (nearer the driver unit 50), and narrower at a distal portion 95 (farther from the driver unit 50). The pilot guide 25 is seated through the driver unit 50 such that the driver unit 50, like the pilot guide 25, moves back and forth along the slot member 20 of the worm shaft 15 when the reel's handle is cranked.

Figure 6:
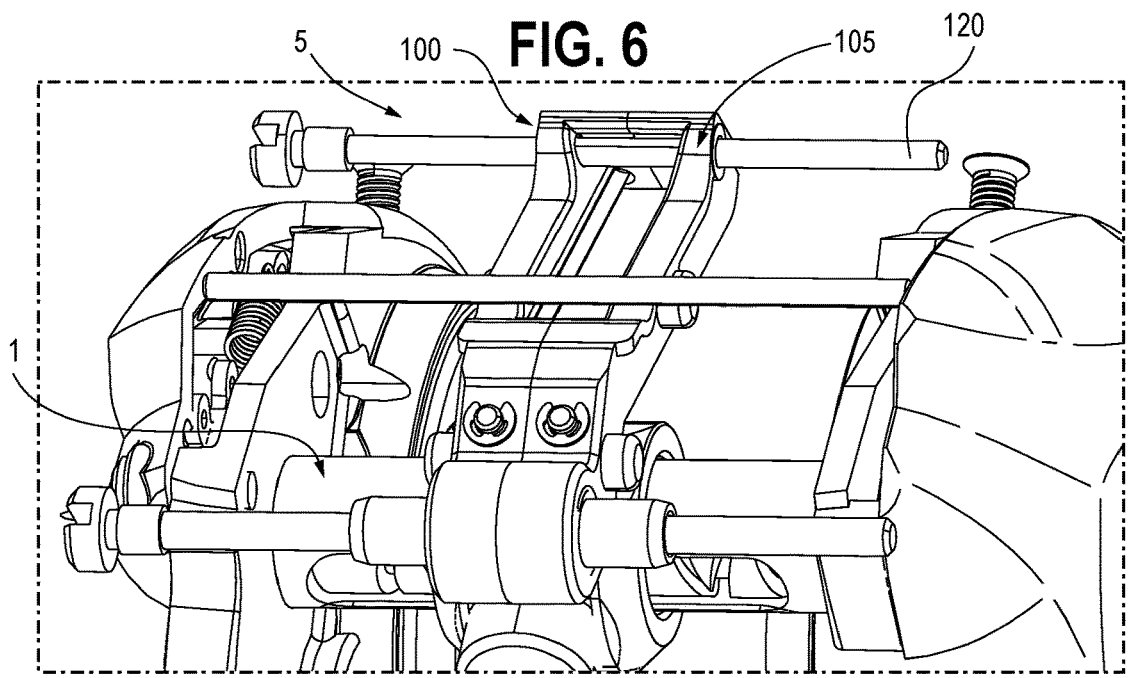
FIG. 6 is a perspective view of the driver assembly and the splitting line guide assembly of FIG. 5 in the closed position.

Turning now to FIGS. 5 and 6, the splitting line guide assembly 5 is illustrated in mechanical connection with the above-described driver assembly 1. The splitting line guide assembly 5 includes each of a first line guide mechanism 100 and a second line guide mechanism 105. As will be described herein below, the line guide mechanisms 100, 105 may be positioned and located close to one another as illustrated in FIGS. 5 and 6, or they may be separated from one another, such as in FIGS. 7-9 (described below). When the line guide mechanisms 100, 105 are situated close to one another, line may be spooled efficiently and effectively as described above to reduce the accumulation of line on one end of a spool. When the line guide mechanisms 100, 105 are separated from one another, line friction is reduced so that when an angler is casting, his or her casting ability is not reduced by friction created in the line.

As illustrated in FIG. 5, each of the line guide mechanisms 100, 105 preferably include a spring-loaded plunger member 110 that extends through the body 111 of the line guide mechanisms 100, 105. Each of the plunger members 110 may be surrounded by a spring 115. When the splitting line guide assembly 5 is in a position that allows the first line guide mechanism 100 and the second line guide mechanism 105 to be positioned near one another, the plunger members 110 are retained within the slotted portion 65 of the driver unit 50 on the front face 60 of the driver unit 50. In this position, bulbous ends 116 of the plunger members 110 are preferably adjacent to the interior portion 80 of the wall member 75 of the driver unit 50. In this position, with the guide mechanisms 100, 105 and their associated plunger members 110 retained within the slotted portion 65, as an angler rotates the reel's handle, the crank shaft, main gear, and thus the gear member 10 rotate. In turn, the driver unit 50 and pilot guide 25 (not illustrated, because it is located beneath the worm shaft 15 in the illustration of FIG. 5) move along the worm shaft 15. This continues for the duration of the spooling process with the line guide mechanisms 100, 105 remaining close to one another. The movement of the line guide mechanisms 100, 105 may be facilitated by being threadingly engaged on an upper spooling shaft 120.

Figure 7:
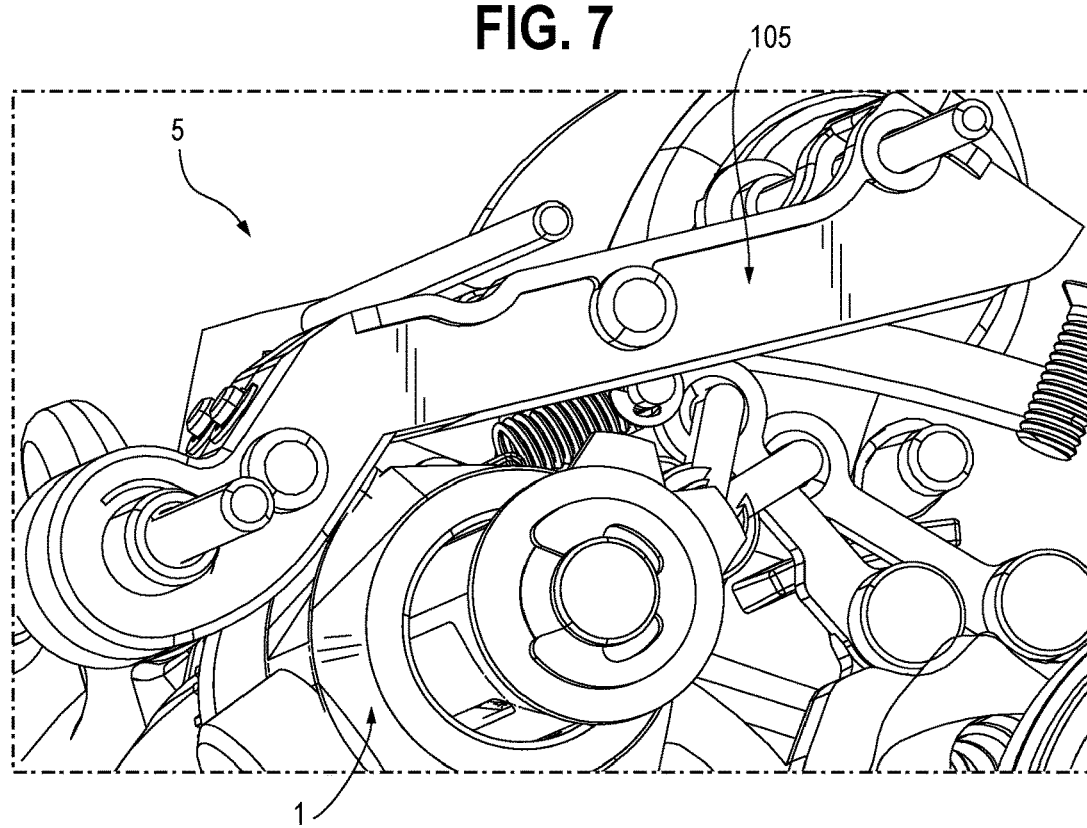
FIG. 7 is a perspective view of the driver assembly and the splitting line guide assembly of FIGS. 5 and 6 in a closed position.
Figure 8:
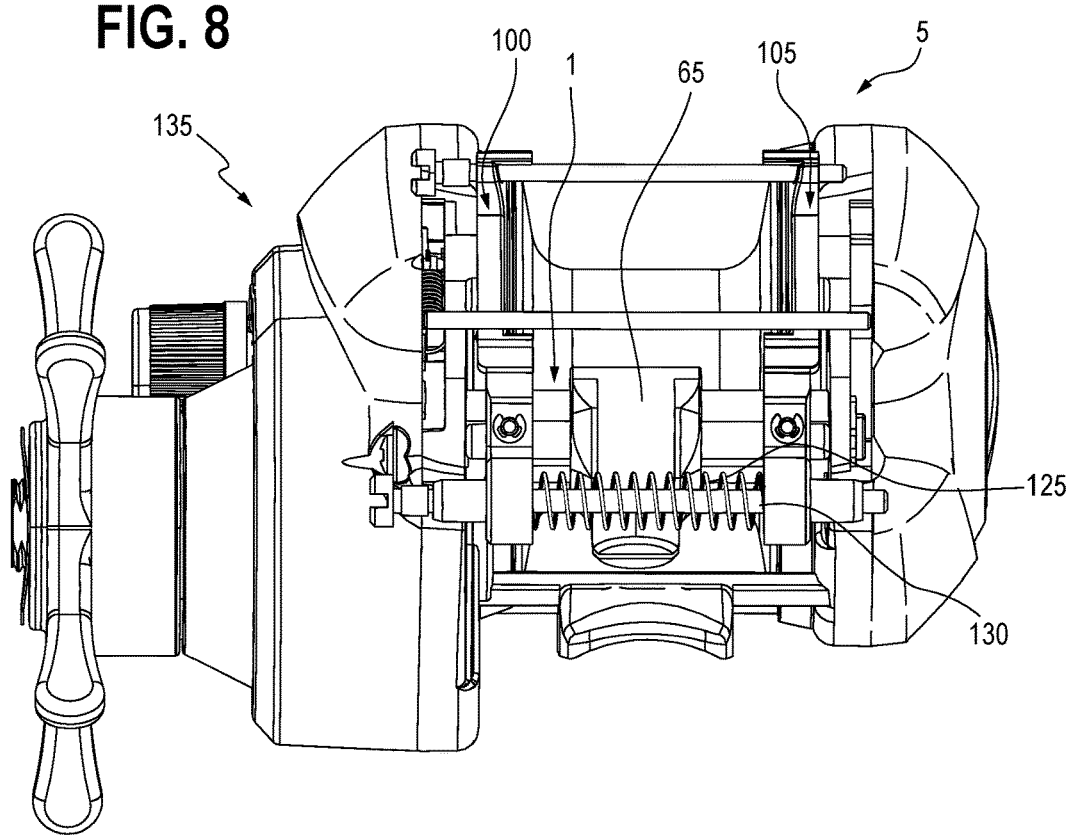
FIG. 8 is a front plan view of the driver assembly and the splitting line guide assembly of FIGS. 5-7 in the open position.

Turning to FIGS. 7 and 8, when an angler is prepared to cast, he or she may depress a thumb bar (not illustrated) such that the reel is placed in free spool. When this takes place, a clutch mechanism (activated by depressing the thumb bar) causes the driver assembly 1 to rotate forwardly. When the driver assembly 1 is rotated forwardly, the line guide mechanisms 100, 105 and their associated plunger members 110 lose contact with the interior portion 80 of the wall member 75. As such, the line guide mechanisms 100, 105 are released from within the slotted portion 65 of the driver unit 50. With the line guide mechanisms 100, 105 displaced from the slotted portion 65, a spring member 125 positioned and located on a shaft 130 distances the line guide mechanisms 100, 105 from one another. The shaft 130 may be longer than the driver assembly 1 to ensure that the line guide mechanisms 100, 105 are retained within the representative baitcaster reel 135. In alternative embodiments, the line guide mechanisms 100, 105 may include magnets having the same polarization such that they repel one another to remain at a distance from one another during casting. In this position, the line guide mechanisms 100, 105 may stay distant from one another during casting. This allows line to freely spool and reduce friction to increase casting distance.

Figure 9:
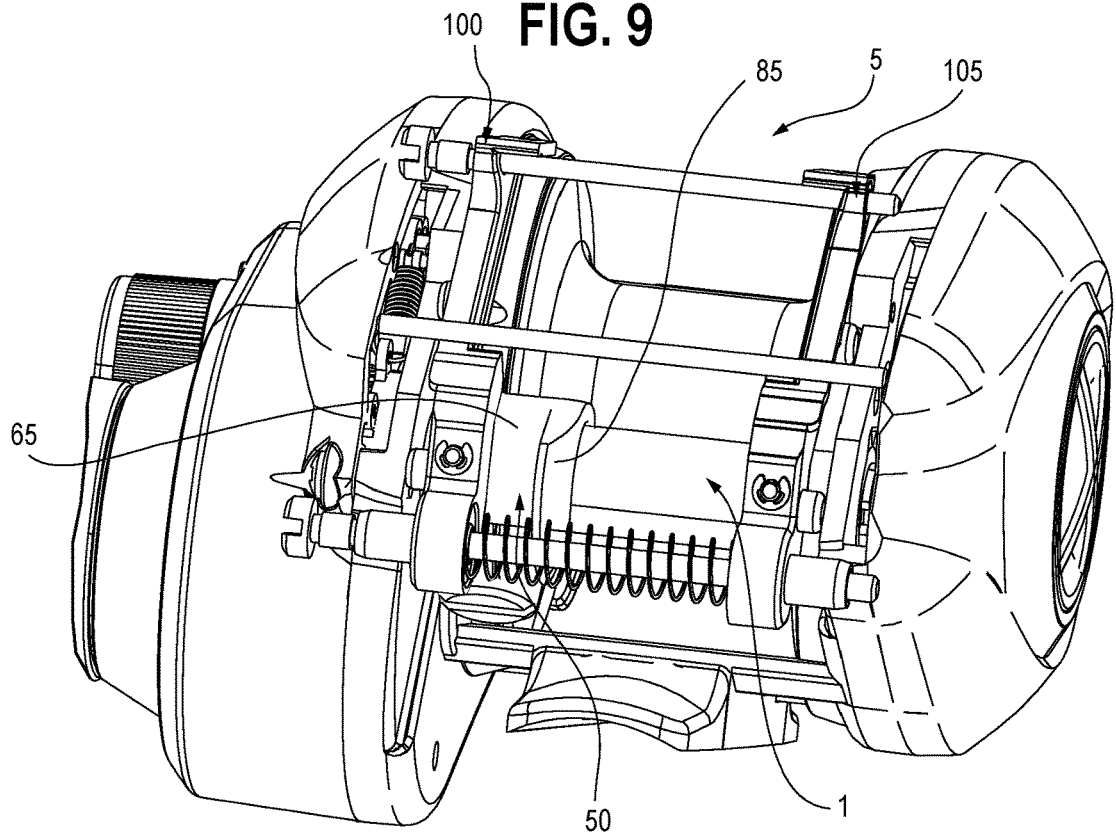
FIG. 9 is a perspective view of the driver assembly and the splitting line guide assembly of FIGS. 5-8 in the open position.

As illustrated in FIG. 9, when a cast is complete, and an angler begins to turn the handle of the reel, the spool starts to rotate, and the driver assembly 1 rotates rearwardly via the clutch mechanism. At this time, the driver unit 50 may oscillate back and forth due to the gear member 10 acting thereon. As it does so, the tapered exterior portions 85 of the driver unit 50 may cause the line guide mechanisms 100, 105 and associated spring-loaded plungers 110 (not illustrated) to ramp upwardly and over the exterior portions 85. Subsequently, the line guide mechanisms 100, 105 may be retained within the slotted portion 65 so that the angler may carry out the reeling process described above. In FIG. 9, the first line guide mechanism 100 is retained in the slotted portion 65 of the driver unit 50, but as the splitting line guide assembly 5 approaches the second line guide mechanism 105, it too will slidingly ramp up the exterior portion 85 until the spring-loaded plunger 110 of the second line guide mechanism 105 seat it within the slotted portion 65.

From the foregoing, it will be seen that the various embodiments of the present invention are well adapted to attain all the objectives and advantages hereinabove set forth together with still other advantages which are obvious and inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles, and scope of the present invention.

Many changes, modifications, variations, and other uses and applications of the present invention will, however, become apparent to those skilled in the art after considering the specification and the accompanying drawings. All such changes, modifications, variations, and other uses and applications which do not depart from the spirit and scope of the invention are deemed to be covered by the invention, which is limited only by the claims which follow.

The invention claimed is:

1. A fishing reel, the fishing reel comprising:
   a driver assembly including a driver unit affixed to the driver assembly;
   a splitting line guide assembly having:
      a first line guide mechanism;
      a second line guide mechanism; and
      an upper spooling shaft upon which the first line guide mechanism and the second line guide mechanism are each threadingly engaged; and
   wherein the first line guide assembly and the second line guide assembly each selectively engage the driver unit.

2. The fishing reel of claim 1, the driver unit further including:
   two wall members that have a tapered exterior, such that the two wall members are wider at a proximal portion than at a distal portion; and
   an interior portion defined between the two wall members.

3. The fishing reel of claim 2, wherein, when the fishing reel is in a first position, the first line guide mechanism and the second line guide mechanism are retained within the interior portion, and when the fishing reel is in a second position, the first line guide mechanism and the second line guide mechanism are disengaged from the interior portion.

4. The fishing reel of claim 3, wherein a shaft is provided on the splitting line guide assembly, the shaft having a spring that prevents the first line guide mechanism and the second line guide mechanism from engaging the driver unit when the fishing reel is in the second position.

5. The fishing reel of claim 3, wherein the first line guide mechanism and the second line guide mechanism each have a magnet affixed thereto, and the magnets prevent the splitting line guide assembly from engaging the driver unit when the fishing reel is in the second position.

6. The fishing reel of claim 1, wherein the driver unit further includes:
   a pilot guide; and
   an extension member on an upper portion of the pilot guide, the extension member including a throated portion extending therefrom.

7. The fishing reel of claim 6, wherein the throated portion of the pilot guide is engaged with a worm gear, the worm gear having a first end and a second end, such that as the worm gear rotates, the driver unit moves from the first end toward the second end of the worm gear.

8. The fishing reel of claim 1, the driver assembly having a worm gear, the worm gear being retained within a body of the driver assembly and engaged with a gear member affixed to the driver assembly.

9. The fishing reel of claim 1, wherein the first line guide mechanism and the second line guide mechanism each further include a plunger member and a spring that surrounds the plunger member.

10. The fishing reel of claim 9, wherein the plunger member of the first line guide mechanism and the plunger member of the second line guide mechanism are retained within the driver unit when the first line guide mechanism and the second line guide mechanism are retained within the driver unit.

* * * * *